US011717815B2

(12) United States Patent
Liu et al.

(10) Patent No.: US 11,717,815 B2
(45) Date of Patent: Aug. 8, 2023

(54) METHOD FOR PREPARING HIGH-EFFICIENCY DENITRIFICATION ACTIVITY CATALYST

(71) Applicant: VALIANT CO., LTD., Yantai (CN)

(72) Inventors: Xiaoling Liu, Yantai (CN); Hu Yuan, Yantai (CN); Songwei Xie, Yantai (CN); Fanmin Meng, Yantai (CN)

(73) Assignee: VALIANT CO., LTD., Yantai (CN)

( * ) Notice: Subject to any disclaimer, the term of this patent is extended or adjusted under 35 U.S.C. 154(b) by 0 days.

(21) Appl. No.: 17/796,881

(22) PCT Filed: Dec. 29, 2020

(86) PCT No.: PCT/CN2020/140493
§ 371 (c)(1),
(2) Date: Aug. 2, 2022

(87) PCT Pub. No.: WO2022/134137
PCT Pub. Date: Jun. 30, 2022

(65) Prior Publication Data
US 2023/0067077 A1     Mar. 2, 2023

(30) Foreign Application Priority Data
Dec. 21, 2020  (CN) .......................... 202011517634.6

(51) Int. Cl.
*B01J 37/08*   (2006.01)
*B01J 35/04*   (2006.01)

(52) U.S. Cl.
CPC ............... *B01J 37/08* (2013.01); *B01J 35/04* (2013.01); *B01J 2523/3712* (2013.01); *B01J 2523/47* (2013.01); *B01J 2523/55* (2013.01); *B01J 2523/68* (2013.01); *B01J 2523/69* (2013.01); *B01J 2523/72* (2013.01); *B01J 2523/845* (2013.01); *B01J 2523/847* (2013.01)

(58) Field of Classification Search
CPC .. B01J 31/1691; B01J 31/1658; B01J 35/002; B01J 35/04; B01J 37/04
See application file for complete search history.

(56) References Cited

U.S. PATENT DOCUMENTS

2006/0029535 A1    2/2006  Ott

FOREIGN PATENT DOCUMENTS

| CN | 102407148 A |   | 4/2012  |          |
|----|-------------|---|---------|----------|
| CN | 105597735 A |   | 5/2016  |          |
| CN | 106140323 A |   | 11/2016 |          |
| CN | 107282034 A |   | 10/2017 |          |
| CN | 108080007 A |   | 5/2018  |          |
| CN | 108722436 A |   | 11/2018 |          |
| CN | 109012684 A | * | 12/2018 | ......... B01D 53/8628 |
| CN | 109012684 A |   | 12/2018 |          |

OTHER PUBLICATIONS

Sheng et al., J Rare Earths, (2012), 30(7), 676-682.*
Reiche et al., Applied Catalysis B Environmental, (1999), v23, p. 187-203.*
Ma et al., Applied Catalysis B: Environmental, v45, (2003), p. 301-309.*
Guo Yanxia, et al., Mechanism of Carbon Burn-Off on V2O5/AC for Simultaneous SO2 and NO Removal During Regeneration in NH3 Atmosphere, Chinese Journal of Catalysis, 2007, pp. 514-520, vol. 28, No. 6.

* cited by examiner

*Primary Examiner* — Yong L Chu
(74) *Attorney, Agent, or Firm* — Bayramoglu Law Offices LLC

(57) ABSTRACT

A method for preparing an active catalyst for high-efficiency denitration is disclosed. The method includes: a catalyst raw material is charged into a denitration reactor, $NH_3$ and an inert gas are introduced and then heating is performed, and the temperature is held and then natural cooling is performed, thereby obtaining the catalyst. The active catalyst can greatly improve the denitration activity in low temperature range, and can not only improve the denitration efficiency under the condition without $SO_2$ and $H_2O$, but also can improve the denitration efficiency under the condition with both $SO_2$ and $H_2O$. The service life of the catalyst is prolonged under the premise of not changing the existing catalyst preparation process, and the economic benefit is significant. The denitration efficiency of a powder catalyst can be increased by 25%, and the denitration efficiency of a honeycombed catalyst or a corrugated catalyst can be increased by 20%.

3 Claims, No Drawings

METHOD FOR PREPARING HIGH-EFFICIENCY DENITRIFICATION ACTIVITY CATALYST

CROSS-REFERENCE TO RELATED APPLICATIONS

This application is the national phase entry of International Application No. PCT/CN2020/140493, filed on Dec. 29, 2020, which is based upon and claims priority to Chinese Patent Application No. 202011517634.6, filed on Dec. 21, 2020, the entire contents of which are incorporated herein by reference.

TECHNICAL FIELD

The invention relates to the field of catalysis, belongs to the air pollution control technology and the environmentally friendly catalyst material technology, and in particular relates to a method for preparing an active catalyst with high-efficiency denitration.

BACKGROUND

The coal-dominated energy structure will lead to the increase of $NO_x$ emissions, which seriously pollutes the ecological environment. How to effectively eliminate $NO_x$ has become an important topic of concern currently in the field of environmental protection.

Among numerous $NO_x$ emission control technologies, the ammonia selective catalytic reduction ($NH_3$-SCR) technology is one of the most widely used and mature flue gas denitration technologies currently in the world. It is widely used in denitration of flue gas from coal-fired power plants and industrial boilers and so on. This technology has the advantages of high denitration efficiency, good selectivity, reliable operation and convenient maintenance. A catalyst is a core part of a $NH_3$-SCR system, and its performance directly affects the overall denitration efficiency and stability of the system, and is the key to the success or failure of a denitration project.

Calcination, as a key step in catalyst preparation, is an important factor affecting the catalyst activity. Excessive calcination temperature will cause catalyst sintering, resulting in catalyst deactivation. Different calcination atmospheres and different valence states of metal active components lead to different catalyst activities. A suitable calcination atmosphere can improve the catalyst activity. CN10808007 discloses a $MnO_x$—$CuSO_4$ composite oxide catalyst. The preparation process uses $N_2$ as a calcination atmosphere. The catalyst has high low-temperature denitration activity and good resistance to $SO_2$ poisoning. Compared with the current catalyst preparation process, the process is complicated, which is not conducive to mass production.

The use of calcination to improve the catalyst activity has been used in hydrodesulfurization catalysts, but it is still blank in the field of flue gas denitration. For example, CN102407148 discloses a method for activating a hydrodesulfurization catalyst. In-situ calcination for carbonization and sulfurization of the catalyst can improve the hydrodesulfurization activity of the catalyst. CN106140323 discloses a hydrogenation catalyst activation method and use thereof. The catalyst is sulfurized in the presence of a mixed gas comprising hydrogen sulfide, an inert gas and hydrogen, and its desulfurization activity and stability are improved. On the premise of not changing the existing catalyst preparation process, the invention only adds one step of calcination, which can improve the denitration activity of the catalyst and prolong its service life, and has significant economic benefits.

SUMMARY

In view of the problem of low efficiency of the existing catalytic denitration, the invention provides a method for preparing an active catalyst for high-efficiency denitration: a catalyst raw material is charged into a denitration reactor, $NH_3$ and an inert gas are introduced and then heating is performed, and the temperature is held and then natural cooling is performed, thereby obtaining the catalyst.

The active component of the catalyst raw material used in the invention is selected from one or more oxides of V, Mo, W, Ce, Fe, Co, Ni, Cu, Nb, Sn, Mn or La, the support is selected from one or more of titanium dioxide, titanium silicon powder, titanium tungsten powder, titanium tungsten silicon powder, silicon dioxide or aluminum oxide, and the finally formed active catalyst is a powder catalyst, a honeycombed catalyst or a corrugated catalyst.

The temperature of the denitration reactor is controlled at 300° C.-550° C., the temperature holding time is 1 h-10 h, $NH_3$ and the inert gas are continuously introduced, and the inert gas is a common gas and may be one selected from nitrogen, helium or argon.

The beneficial effects of the invention are as follows. The active catalyst prepared by the method of the invention can greatly improve the denitration activity of the catalyst in a low temperature range, and can not only improve the denitration efficiency of the catalyst under the condition without $SO_2$ and $H_2O$, but also can improve the denitration efficiency of the catalyst under the condition with both $SO_2$ and $H_2O$. The service life of the catalyst is prolonged under the premise of not changing the existing catalyst preparation process, and the economic benefit is significant. The denitration efficiency of a powder catalyst can be increased by 25%, and the denitration efficiency of a honeycombed catalyst or a corrugated catalyst can be increased by 20%.

DETAILED DESCRIPTION OF THE EMBODIMENTS

The following describes the invention with reference to examples. Examples given are merely used for explaining the invention, and do not limit the scope of the invention.

Example 1

A method for preparing an active catalyst for high-efficiency denitration, comprising the following steps:

(1) A $CoMnCeTiO_2$ honeycombed extruded catalyst was charged into a denitration reactor to test the denitration performance of a fresh sample;

(2) $NH_3$ and $N_2$ were introduced, and the heating was started;

(3) the temperature was held at 300° C.-350° C. for 5 h-6 h;

(4) natural cooling was performed after the temperature holding was completed;

(5) an activated sample was tested for denitration performance with the test conditions below: 500 ppm$NO_x$+500 ppm$NH_3$+10% $O_2$+$N_2$, GHSV=5000 $h^{-1}$.

Example 2

A method for preparing an active catalyst for high-efficiency denitration, comprising the following steps:

(1) A VMoNiTiO$_2$ honeycombed extruded catalyst was charged into a denitration reactor to test the denitration performance of a fresh sample;
(2) NH$_3$ and He were introduced, and heating was started;
(3) the temperature was held at 350° C.-400° C. for 3 h-4 h;
(4) natural cooling was performed after the temperature holding was completed;
(5) an activated sample was tested for denitration performance with the test conditions below: 500 ppmNO$_x$+500 ppmNH$_3$+10% O$_2$+500 ppmSO$_2$+20% H$_2$O+N$_2$, GHSV=10000 h$^{-1}$.

Example 3

A method for preparing an active catalyst for high-efficiency denitration, comprising the following steps:

(1) A VMoTiO$_2$ powder catalyst was charged into a denitration reactor to test the denitration performance of a fresh sample;
(2) NH$_3$ and N$_2$ were introduced, and the heating was started;
(3) the temperature was held at 450° C.-500° C. for 1 h-2 h;
(4) natural cooling was performed after the temperature holding was completed;
(5) an activated sample was tested for denitration performance with the test conditions below: 500 ppmNO$_x$+500 ppmNH$_3$+10% O$_2$+500 ppmSO$_2$+20% H$_2$O+N$_2$, GHSV=50000 h$^{-1}$.

Example 4

A method for preparing an active catalyst for high-efficiency denitration, comprising the following steps:

(1) A VWCeTiO$_2$ powder catalyst was charged into a denitration reactor to test the denitration performance of a fresh sample;
(2) NH$_3$ and N$_2$ were introduced, and the heating was started;
(3) the temperature was held at 400° C.-450° C. for 7 h-8 h;
(4) natural cooling was performed after the temperature holding was completed;
(5) an activated sample was tested for denitration performance with the test conditions below: 500 ppmNO$_x$+500 ppmNH$_3$+10% O$_2$+500 ppmSO$_2$+20% H$_2$O+N$_2$, GHSV=80000 h$^{-1}$.

Example 5

A method for preparing an active catalyst for high-efficiency denitration, comprising the following steps:

(1) A MnCeTiO$_2$ powder catalyst was charged into a denitration reactor to test the denitration performance of a fresh sample;
(2) NH$_3$ and He were introduced, and heating was started;
(3) the temperature was held at 300° C.-350° C. for 9 h-10 h;
(4) natural cooling was performed after the temperature holding was completed;
(5) an activated sample was tested for denitration performance with the test conditions below: 500 ppmNO$_x$+500 ppmNH$_3$+10% O$_2$+N$_2$, GHSV=100000 h$^{-1}$.

Example 6

A method for preparing an active catalyst for high-efficiency denitration, comprising the following steps:

(1) A VWTiO$_2$ honeycombed coated catalyst was charged into a denitration reactor to test the denitration performance of a fresh sample;
(2) NH$_3$ and N$_2$ were introduced, and the heating was started;
(3) the temperature was held at 400° C.-450° C. for 2 h-3 h;
(4) natural cooling was performed after the temperature holding was completed;
(5) an activated sample was tested for denitration performance with the test conditions below: 500 ppmNO$_x$+500 ppmNH$_3$+10% O$_2$+500 ppmSO$_2$+20% H$_2$O+N$_2$, GHSV=20000 h$^{-1}$.

Example 7

A method for preparing an active catalyst for high-efficiency denitration, comprising the following steps:

(1) A VMoWTiO$_2$ honeycombed coated catalyst was charged into a denitration reactor to test the denitration performance of a fresh sample;
(2) NH$_3$ and Ar were introduced, and heating was started;
(3) the temperature was held at 450° C.-500° C. for 8 h-9 h;
(4) natural cooling was performed after the temperature holding was completed;
(5) an activated sample was tested for denitration performance with the test conditions below: 500 ppmNO$_x$+500 ppmNH$_3$+10% O$_2$+500 ppmSO$_2$+20% H$_2$O+N$_2$, GHSV=30000 h$^{-1}$.

Example 8

A method for preparing an active catalyst for high-efficiency denitration, comprising the following steps:

(1) A VMoCeTiO$_2$ corrugated catalyst was charged into a denitration reactor to test the denitration performance of a fresh sample;
(2) NH$_3$ and He were introduced, and heating was started;
(3) the temperature was held at 500° C.-550° C. for 4 h-6 h;
(4) natural cooling was performed after the temperature holding was completed;
(5) an activated sample was tested for denitration performance with the test conditions below: 500 ppmNO$_x$+500 ppmNH$_3$+10% O$_2$+500 ppmSO$_2$+20% H$_2$O+N$_2$, GHSV=30000 h$^{-1}$.

Example 9

A method for preparing an active catalyst for high-efficiency denitration, comprising the following steps:

(1) A VWCoTiO$_2$ corrugated catalyst was charged into a denitration reactor to test the denitration performance of a fresh sample;
(2) NH$_3$ and N$_2$ were introduced, and the heating was started;
(3) the temperature was held at 450° C.-500° C. for 1 h-2 h;
(4) natural cooling was performed after the temperature holding was completed;
(5) an activated sample was tested for denitration performance with the test conditions below: 500 ppmNO$_x$+500 ppmNH$_3$+10% O$_2$+500 ppmSO$_2$+20% H$_2$O+N$_2$, GHSV=20000 h$^{-1}$.

Comparative Example 1

A method for preparing a denitration catalyst, comprising the following steps:

(1) A $TiO_2$ honeycombed coated catalyst was charged into a denitration reactor to test the denitration performance of a fresh sample;

(2) $NH_3$ and $N_2$ were introduced, and the heating was started;

(3) the temperature was held at 400° C.-450° C. for 2 h-3 h;

(4) natural cooling was performed after the temperature holding was completed;

(5) an activated sample was tested for denitration performance with the test conditions below: 500 ppm$NO_x$+500 ppm$NH_3$+10% $O_2$+500 ppm $SO_2$+20% $H_2O$+$N_2$, GHSV=20000 $h^{-1}$.

The catalysts obtained in Examples 1-9 and Comparative Example 1 were tested for catalytic denitration effects at different temperatures, and the denitration efficiencies are shown in Table 1.

It can be seen from the test results in Table 1 that the denitration efficiencies of all the catalysts of Examples 1-9 are increased after calcination and activation, and that with the increase of the test temperature, the differences between the activated samples and the fresh samples are reduced, and when the test temperature is 180° C., the differences between the two are the largest (15%-30%), indicating that the method provided by the invention can greatly improve the denitration activity of the catalyst in low temperature range.

Comparative Example 1 has no active component with $TiO_2$ as the support, the fresh sample and the activated sample have similar denitration efficiencies, and the denitration efficiencies at 180° C.-400° C. are less than 5%, indicating that the method provided by the invention cannot improve the denitration activity of the support.

The above-mentioned descriptions are merely preferred embodiments of the invention but not intended to limit the invention, and any modifications, equivalent replacements, improvements, etc. made within the spirit and principles of the invention should be included within the scope of protection of the present solution.

TABLE 1

Denitration efficiency at different temperatures

| Catalyst | Denitration efficiency (%) Temperature (° C.) | | | | | | |
|---|---|---|---|---|---|---|---|
| | 180 | 200 | 250 | 300 | 350 | 400 | Remark |
| Example 1 | 55.6 | 68.7 | 76.5 | 84.3 | 90.6 | 87.1 | Fresh sample |
| | 77.5 | 86.0 | 92.1 | 96.6 | 98.9 | 93.2 | Activated sample |
| Example 2 | 38.7 | 53.8 | 66.7 | 78.8 | 89.4 | 93.5 | Fresh sample |
| | 63.7 | 74.0 | 84.4 | 92.5 | 97.1 | 99.0 | Activated sample |
| Example 3 | 33.9 | 57.7 | 73.7 | 87.2 | 95.9 | 98.9 | Fresh sample |
| | 56.8 | 79.8 | 91.3 | 97.5 | 99.2 | 99.8 | Activated sample |
| Example 4 | 27.7 | 42.3 | 53.8 | 66.7 | 78.8 | 89.4 | Fresh sample |
| | 55.4 | 68.6 | 79.4 | 88.8 | 94.9 | 98.1 | Activated sample |
| Example 5 | 49.3 | 68.2 | 82.1 | 92.6 | 98.1 | 93.5 | Fresh sample |
| | 71.3 | 89.0 | 95.2 | 98.2 | 99.6 | 94.3 | Activated sample |
| Example 6 | 52.6 | 68.7 | 76.5 | 84.3 | 90.6 | 93.6 | Fresh sample |
| | 69.8 | 85.9 | 93.8 | 95.6 | 96.8 | 97.0 | Activated sample |
| Example 7 | 40.2 | 58.5 | 73.3 | 81.9 | 88.5 | 92.1 | Fresh sample |
| | 64.5 | 80.8 | 92.7 | 94.5 | 95.1 | 97.1 | Activated sample |
| Example 8 | 39.6 | 56.3 | 68.3 | 80.0 | 87.7 | 92.3 | Fresh sample |
| | 58.6 | 73.9 | 85.6 | 91.5 | 94.7 | 95.6 | Activated sample |
| Example 9 | 46.3 | 65.9 | 78.9 | 84.0 | 91.1 | 92.7 | Fresh sample |
| | 65.6 | 79.9 | 88.3 | 92.7 | 96.3 | 97.2 | Activated sample |
| Comparative example 1 | 3.0 | 3.5 | 3.9 | 3.9 | 4.1 | 4.3 | Fresh sample |
| | 3.2 | 3.6 | 3.8 | 4.0 | 4.2 | 4.4 | Activated sample |

What is claimed is:

1. A method for preparing an active catalyst for high-efficiency denitration, comprising:
    charging a catalyst product into a denitration reactor,
    introducing $NH_3$ and an inert gas into the denitration reactor,
    heating the denitration reactor,
    holding a temperature of the denitration reactor, and
    cooling the denitration reactor naturally to obtain the active catalyst;
    wherein an active component of the catalyst product is selected from one or more oxides of Mo, W, Fe, Co, Ni, Cu, Nb, Sn, or La, and a support is selected from one or more of titanium silicon powder, titanium tungsten powder, titanium tungsten silicon powder, silicon dioxide or aluminum oxide;
    wherein the inert gas is one of nitrogen or argon; and
    wherein the temperature is 300° C.-550° C., and a time of holding the temperature of the denitration reactor is 2 h-10 h.

2. The method for preparing the active catalyst for high-efficiency denitration according to claim 1, wherein the active catalyst obtained is a powder catalyst, a honeycombed catalyst or a corrugated catalyst.

3. The method for preparing the active catalyst for high-efficiency denitration according to claim 1, wherein the active catalyst obtained is a honeycombed catalyst.

* * * * *